United States Patent [19]

Pinelli et al.

[11] Patent Number: 4,514,040
[45] Date of Patent: Apr. 30, 1985

[54] PRISMATIC REFRACTOR FOR CONCENTRATING SOLAR ENERGY ON A SUITABLE COLLECTING SURFACE, OF FIXED POSITION WITH RESPECT TO TIME

[75] Inventors: Tazio Pinelli, Pavia; Francesco Sebastiano, Termoli, both of Italy

[73] Assignee: Societa' Italiana Vetro-Siv-S.p.A., San Salvo, Italy

[21] Appl. No.: 468,994

[22] Filed: Feb. 23, 1983

[30] Foreign Application Priority Data

Mar. 11, 1982 [IT] Italy .................... 20105 A/82

[51] Int. Cl.³ .................... G02B 5/04; G02B 3/08
[52] U.S. Cl. .................... 350/286; 350/452
[58] Field of Search .............. 350/286, 287, 452, 436; 126/440; 136/246; 362/339, 309

[56] References Cited

U.S. PATENT DOCUMENTS

| 2,344,295 | 3/1944 | Franck | 362/339 |
| 3,622,231 | 11/1971 | Hansen | 350/436 |
| 3,708,222 | 1/1973 | Stern | 350/452 |
| 3,784,282 | 1/1974 | Yamazaki et al. | 350/42 |
| 4,204,881 | 5/1980 | McGrew | 350/452 |
| 4,312,330 | 11/1982 | Holdridge | 350/452 |

FOREIGN PATENT DOCUMENTS

| 429340 | 5/1935 | United Kingdom | 350/286 |
| 2021807 | 12/1979 | United Kingdom | 350/452 |

OTHER PUBLICATIONS

C. J. Slelten et al., *Applied Optics*, vol. 19, No. 9, pp. 1439–1453, May, 1980.

*Primary Examiner*—Jon W. Henry
*Attorney, Agent, or Firm*—Wenderoth, Lind & Ponack

[57] ABSTRACT

The present invention provides a fixed refractor of transparent material consisting of various afocal adjacent straight prismatic elements of specific dimensions which are asymmetrically arranged about an axis parallel to the length of said prisms, to obtain a solar energy concentrating power equal to or greater than 2.6 for a substantial portion of the day.

4 Claims, 7 Drawing Figures

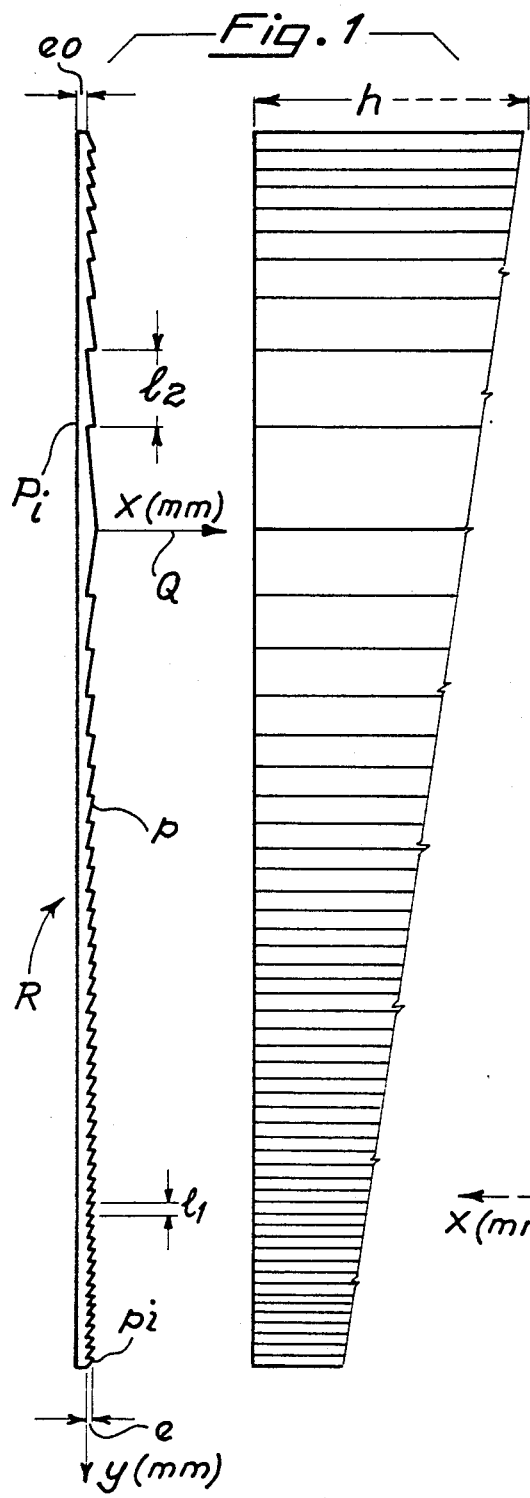
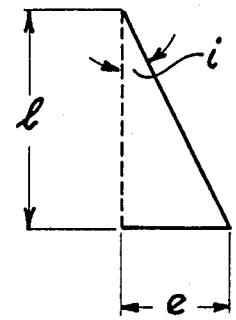
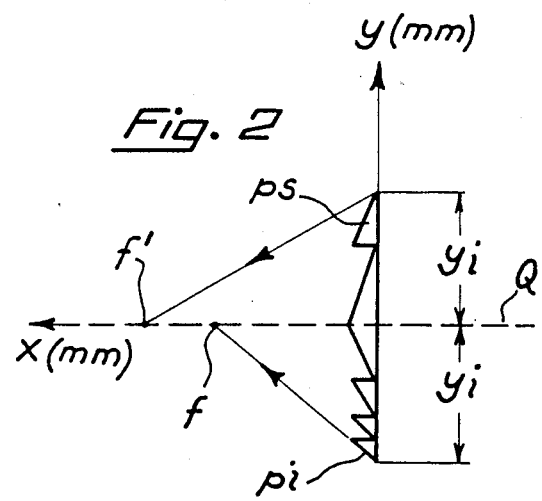

PRISMATIC REFRACTOR FOR CONCENTRATING SOLAR ENERGY ON A SUITABLE COLLECTING SURFACE, OF FIXED POSITION WITH RESPECT TO TIME

SUMMARY OF THE INVENTION

The present invention provides a refractor of transparent material and of fixed position with respect to time, said refractor consisting of various afocal, flanked, structural elements, such as straight prisms (p) of suitable dimensions which are arranged asymmetrically about an axis of joinder (Q) so as to obtain a solar energy concentrating (C) power or a suitable collecting surface (Pmc) equal to or greater than 2.6 during the period from 8 hours to 16 hours.

Particularly suitable for the above purpose is a refaractor (R) in which prisms (p) have height (e) equal to or greater than 3 mm and width (l) equal to or greater than 4 mm in the lower part consisting of, for example, 42 elements, and equal to or greater than 6.5 mm in the upper part of the refractor consisting of, for example, 9 elements; in this way a maximum concentration ratio (C) can be reached on a collecting surface (Pmc) located at a distance of about 350 mm from the flat face of refractor (R)—FIG. 1.

DETAILED DESCRIPTION

The present invention relates to a refractor consisting of several straight prisms, each one being suitably dimensioned and being made of transparent material, wherein said prisms are arranged to form a structure with one flat face and with one serrated face.

In order to obtain refractors suitable for concentrating solar energy, use was made in the past of the capacity of a lens with Fresnel type profile to concentrate a beam of parallel rays towards the focal point. Refractors using said lenses are already known in the art; these refractors are either mounted on sun followers or else they can be fixed, but in this latter case they are coupled to suitable elements simulating the presence of sun follower mechanisms.

Applications of said refractors are relatively expensive and are complex to put into practice.

The objective of a preceding Patent Application by the very same Applicant is that of a refractor made up of Fresnel type elements, but which is asymmetrical, that is, it no longer has one single focal point. Appreciable concentration of the transmitted solar energy can be accomplished by using this refractor, even though its position remains fixed with time.

Hence much simpler and easier-to-use systems can be obtained.

The obtaining of the aforementioned refractory sections, however, always leads to manufacturing problems, and therefore to relatively high costs.

Hence the Applicant has carried out further experiments and has now discovered a new and novel type of refractor which is object of the present invention.

Such refractor can be considered revolutionary in that it can be manufactured both easily and at relatively low cost, of any solid transparent material; it is also possible to use, for example, any known type of continuous sheet glass manufacturing equipment.

Furthermore, by adopting a system in accordance with the present invention, the serrated face of the refractor can be more easily covered with suitable layers of high reflecting power in order to minimize dispersion towards the outside of energy reflected by the user system, of which the refractor according to the invention forms the cover.

In refractors of type hitherto known in the art, deposition of said reflecting layers was found, instead, to be less easy owing to the shape of the surface.

It should also be pointed out that the refractor in accordance with the invention can be used as a modular component for larger collecting surfaces.

In fact, multiple combination solutions can be devised and obviously, in order to maintain the concentration ratio associated with the modular component, there will be as many sectors of the collecting surface as there modular components employed.

The accompanying drawings, given as exemplification of the principles of the invention only, illustrate a preferred embodiment of the prismatic asymmetrical refractor in accordance with the invention.

More precisely, in these drawings:

FIG. 1 is respectively a sectional view and a fragmentary view of the refractor in accordance with the invention;

FIG. 1a is an enlarged scale, for a better understanding, of a single straight prism of said refractor;

FIG. 2 shows a schematic view of the refractor exemplifying the definition of "focal length";

Figure 3:
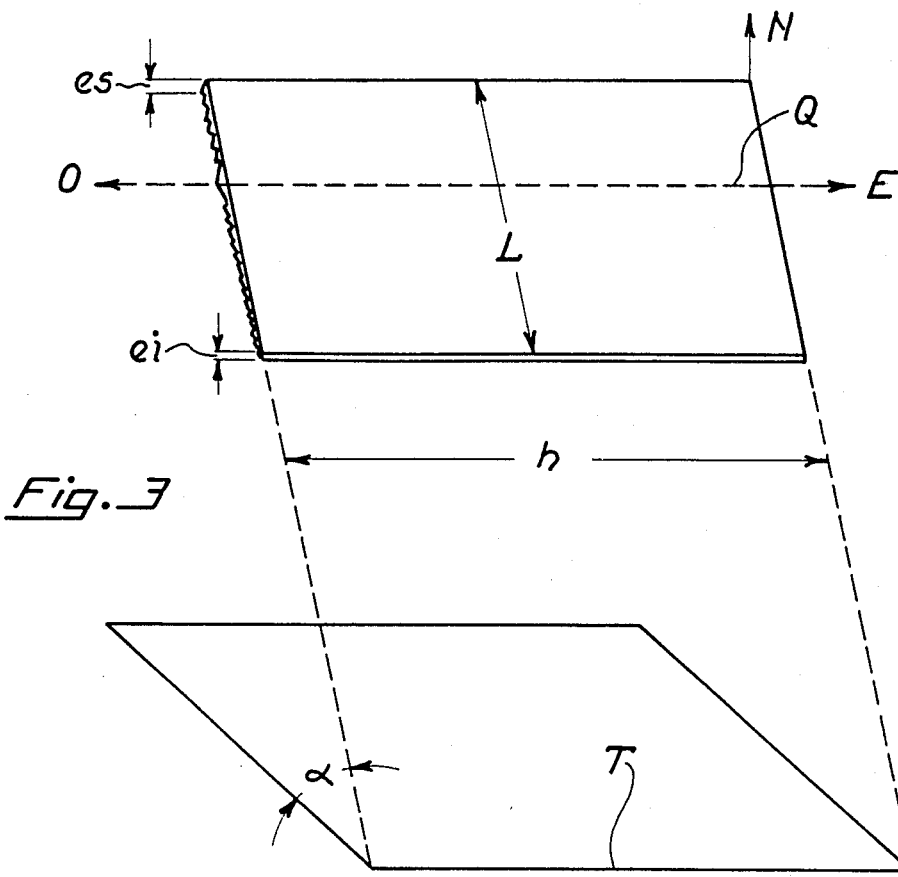
FIG. 3 is likewise a schematic representation of the refractor in FIG. 1 shown in position such that the solar energy is received on its flat face.

As can be seen in the drawing, the object of the present invention is, we repeat, a refractory section R of fixed position with time, which is obtained by using various afocal structural elements, that is, straight prisms p, which are arranged side-by-side and which are suitably dimensioned so as to permit a concentration ratio $C \geq 2.60$ during a considerable period of the day.

The concentration ratio C is understood, in this case, to be the ratio between width L of the refractor and width L' of the surface illuminated by the sun on a collecting surface during the period of the day under consideration.

The distinctive feature of the system in accordance with the invention is that a plane exists in the semi-space opposite to the plane of incidence Pi of the sun's rays, where a concentration ratio $C \geq 2.6$, as defined previously, can be reached for a period of up to eight hours, depending on the season. This plane is defined as the plane of maximum concentration Pmc (see FIG. 6).

In addition to the plane of maximum concentration Pmc, the solar energy can be collected on any plane located at any distance d from the flat face of refractor R.

Of course, the concentratio ratio C obtained will be in relation to the distance d: the closer is said plane to refractor R, the lower will be said concentration ratio.

Refractor R, in accordance with the present invention, consists, as already stated, of straight prisms p, or rather of two orders of the latter, each one possessing its own geometric characteristics.

The two orders of prisms are joined about a suitable axis Q and are made integral by means of, for example, a flat support layer whose thickness eo is not critical for the optical performance of the system.

The arrangement, dimensions (height e, width l, depth h) (FIGS. 1, 1a) and the number of the various straight prisms p, arranged above and below the axis of joinder Q (see FIGS. 1 to 3) are such as to form a refractor R capable of limiting to a maximum degree the excursion of the concentrated solar image, due to the apparent movement of the sun, on a particular plane (the plane of maximum concentration Pmc).

More specifically, the arrangement of prisms p must be such that, of the two prisms, that it the one ps above the axis of joinder Q and the other pi below said axis which are arranged to collect the incident sun's rays at equidistant points at a distance (yi) from said axis Q, the lower element pi must always have a smaller "focal length" f than the focal length f' of the upper element ps (FIG. 2).

"Focal length" of a prism p in relation to a given radius and given position of the prism, is defined as the distance from the flat face of the refractor R, of the point of intersection between the straight line, perpendicular to said face, passing through axis of join Q and the outermost ray transmitted by prism p when the angle of incidence on the flat plane is zero.

Referring to FIG. 1, it can be seen that in the case of the elements with maximum height e equal to 3 mm, the sun's rays at 8 hours on the 22nd June at latitude 42° N is totally reflected by prisms pi of width $l_1$ equal to 4 mm located in the lower region of refractor R and by prisms ps of width $l_2$ equal to 13 mm or less located in the upper part of the refractor.

The above is achieved by positioning the flat surface of refractor R perpendicular to the direction of the sun's rays at midday, with East-West orientation.

In FIG. 3, α denotes the angle formed by the axis of the refracted rays with horizontal plane T.

More especially, a minimum width of 4 mm is established for the lower element pi and of 6.5 mm for the upper element ps.

These outermost elements produce total reflection for a modest amount of time starting from 8 hours, and therefore optimum operating conditions are achieved against an initial modest loss of energy.

After having established the elements with minimum width l as the upper and lower elements, the intermediate prisms p were dimensioned by trial and error in order to have the maximum concentration C on a given plane which was located, as a first approximation, at a distance d=350 mm from the flat face of refractor R.

The lower part of refractor R (again see FIG. 1) is much more extensive than the upper part; in this example, there are 42 prisms p, of varying width l in the lower part, and 9 prisms p of varying width l The refractory section R in accordance with the invention can be made of any transparent material. For example, suppose such material has a refractive index of 1.5; refractor R will have the capacity to concentrate and limit excursion of the sun's image, so as to obtain a concentration ratio as follows during the period from 8 hours to 16 hours:

$$C = \frac{L}{L'} = 2.60 \text{ (see FIGS. 3 to 6)}$$

and on a plane of maximum concentration located at a distance d=358 mm.

Figure 4:
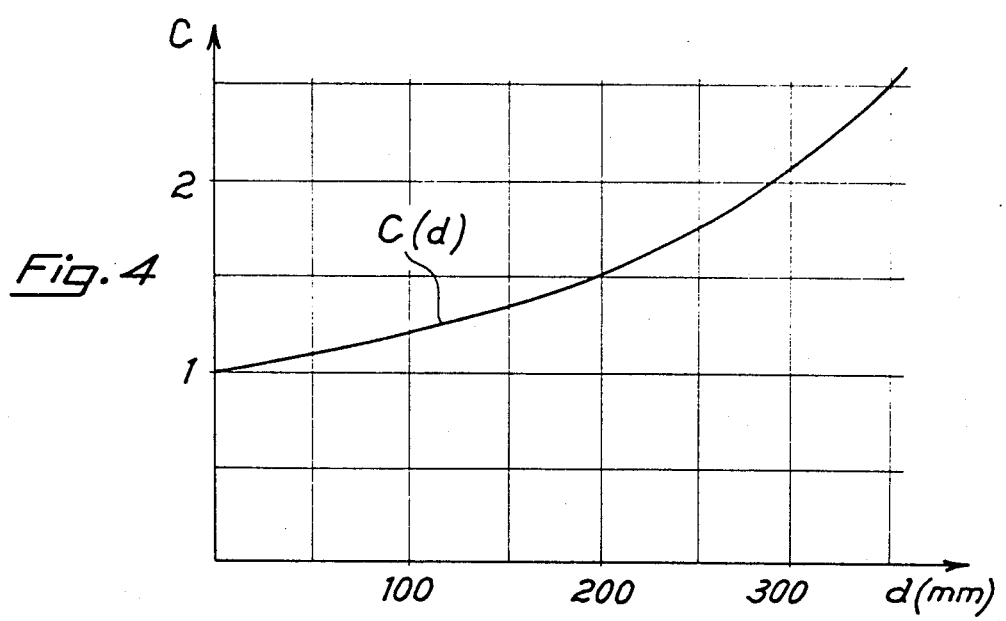
FIG. 4 is a chart plotting the concentration ratio in relation to the distance of the collecting surface from the refractor.

FIG. 4 shows how this concentration ratio varies when passing from d=358 mm to d=0.

As regards the energy lost by the outermost elements which determine total reflection, it can be calculated that said energy loss is only 1.5% of the refracted energy during the period from 8 to 16 hours.

Figure 5:
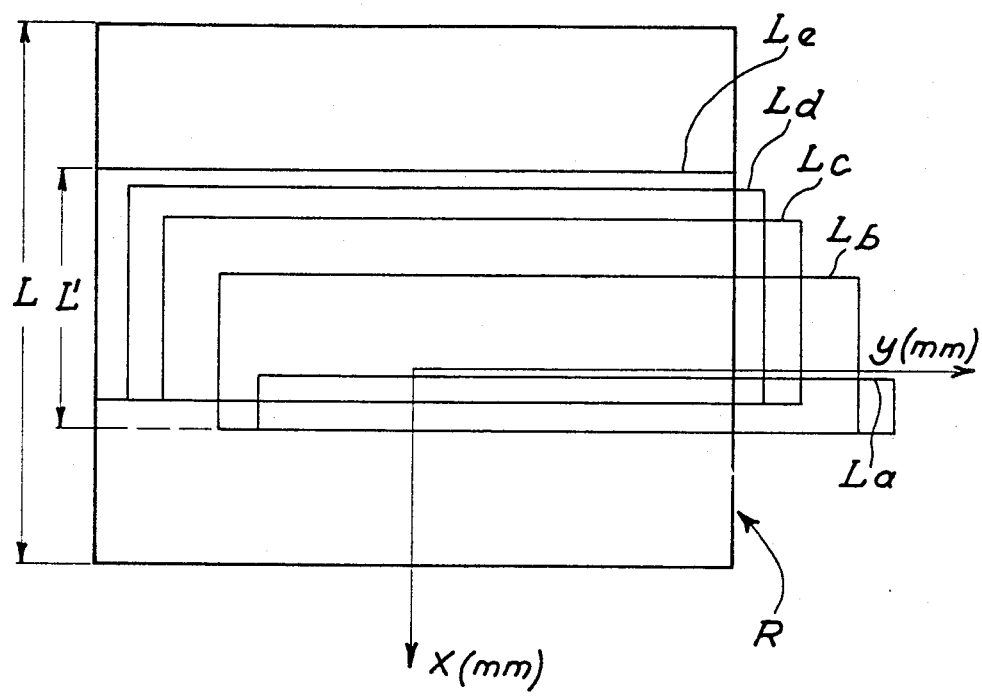
FIG. 5 shows the solar images transmitted by the refractor on the plane of maximum concentration from 8 hours to 12 hours.

FIG. 5 is a graphic representation of the sun's image as it appears on the plane of maximum concentration Pmc.

R denotes the refractor outline, while La, Lb, Lc, Ld, Le denote the outlines of the sun's image during the period from 8 hours to 12 hours, and the concentration ratio C=(L/L') is easy to deduce.

The sun's images during the afternoon hours are not indicated as these have the same dimensions as the images corresponding to the respective morning hours which are metrically about 12 hours and are disposed symmetrical with respect to the mid plane of said refractor.

By calculation, it is found that the plane of maximum concentration Pmc is at a slightly different distance from that assumed at first, that is d=358 mm.

Figure 6:
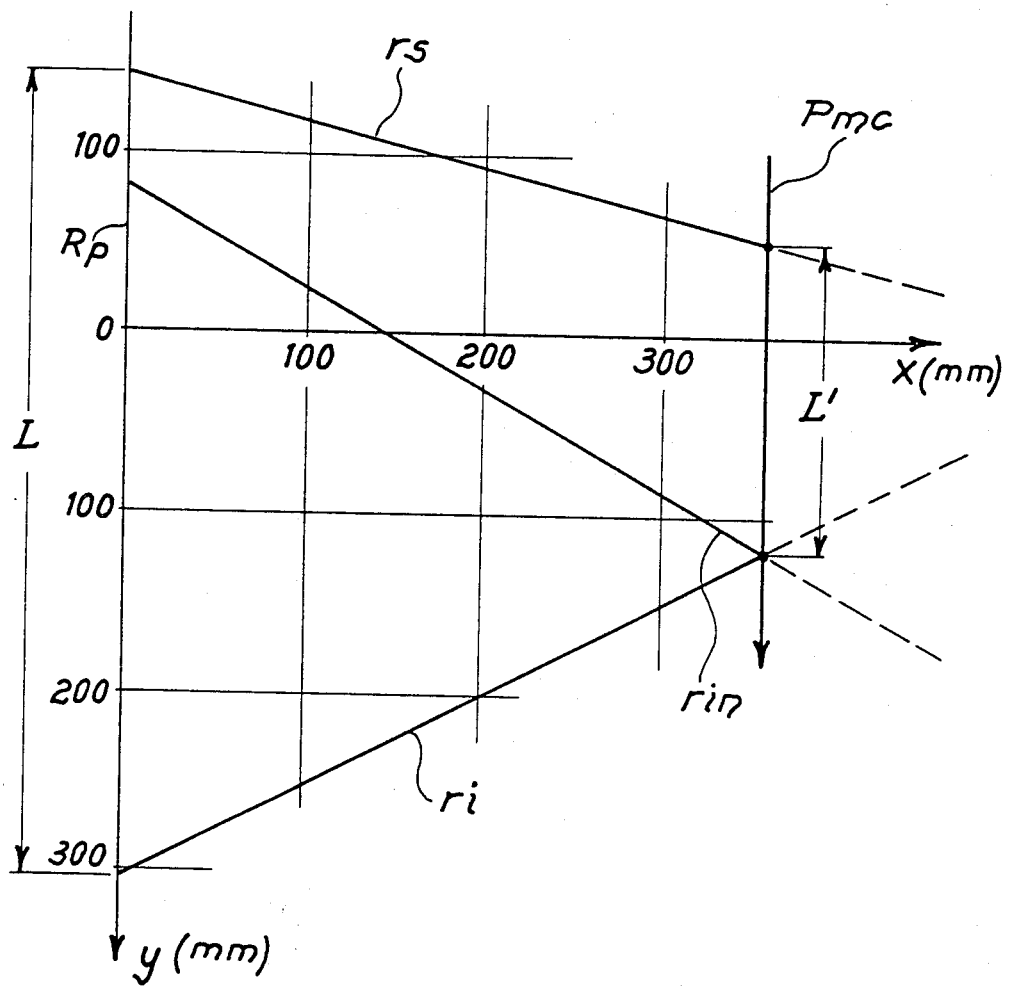
FIG. 6 is the chart plotting the outermost rays refracted by the prismatic elements, used in the determination of the distance of the plane of maximum concentration from the refractor.

In fact, in FIG. 6, the y axis plots the plane on which are flanked the prismatic elements (FIG. 1), while the x axis plots the distance d; the upper ray rs corresponds to the ray refracted by the outermost end of the 9th upper element at 12 hours, and the lower ray ri corresponds to the ray refracted, again at 12 hours, by the outermost end of the 42nd lower element, while rin represents the intermediate ray refracted by the 2nd upper element at 8 hours.

The intersection between ri and rin gives the exact position of the plane of maximum concentration Pmc which is located at:

$$d = 358.34 \text{ mm}$$

On this plane and during the period from 8 hours to 16 hours, the maximum and minimum co-ordinates of the transmitted rays along the y axis are as follows:

$$Y \max = 118.14 \text{ mm}$$

$$Y \min = 53.52 \text{ mm}$$

whereby a concentration ratio is obtained $$C = \frac{447}{118.14 + 53.52} = 2.60$$

in which 447 mm is the total width of the 53 prismatic elements p governing the width L of refractor R in accordance with the example.

Refractor R in accordance with the invention, can be made with a thickness e+eo of just a few mm, therefore it can be lighter and with high performance in terms of energy transmission.

Hence it can be concluded that the refractor R in question is easier to construct and is more convenient to handle; furthermore, its performance is higher.

Naturally these characteristics are in addition to the novel advantage of concentrating solar energy without use of sun follower systems.

We claim:

1. A stationary refractor for concentrating solar energy onto a planar collecting region in a concentration ratio of at least 2.6 for a substantial period during the day, said concentration ratio being the ratio of the width of the refractor to the width of the portion of the collecting region illuminated by the sun during said period, said width being perpendicular to the length and height of said refractor and said length and height being perpendicular to each other;

said refractor comprising a flat base surface and a serrated top surface, the serrated top surface comprising a plurality of optical elements as follows:

a central, non-focussing, straight prismatic element and a plurality of adjacent, non-focussing, straight prismatic elements on both sides of said central element, said prismatic elements having two exposed faces, said central and adjacent prismatic elements having a maximum height of 3 mm., independent of said base, said refractor having an axis disposed parallel to the length of said straight prismatic elements, said axis dividing said refractor into an upper and a lower portion, said central prismatic element being disposed on said axis and having both faces thereof intersecting at said axis but said both faces not being perpendicular to said base, the next adjacent element on either side of said central element having a face perpendicular to said base and in contact with the bottom of a face of said central element and a face which forms a diagonal which intersects said perpendicular face, the remaining adjacent elements having a face perpendicular to said base and a face intersecting said face perpendicular to said base, said lower portion and said upper portion containing an unequal number of said prismatic elements, the lower portion having a greater number of said elements than the upper portion, the width of the prismatic elements in the lower portion being equal to or greater than 4 mm. and equal to or greater than 6.5 mm. in the upper portion and the faces which form diagonals on opposite sides of said axis facing each other.

2. The refractor according to claim 1 wherein the number of adjacent prismatic elements in the lower portion is 9, the number of adjacent prismatic elements in the upper portion is 42, and the maximum concentration ratio is obtained in a plane lying at a distance of about 350 mm. from said refractor.

3. The refractor according to claim 1 wherein said substantial period is between 0800 and 1600 hours.

4. The refractor according to claim 1 wherein said optical elements are integral with said flat base surface.

* * * * *